F. FENTON.
PROCESS FOR MAKING PNEUMATIC TIRES AND AIR BAG THEREFOR.
APPLICATION FILED OCT. 18, 1919.

1,335,101. Patented Mar. 30, 1920.

Inventor:
Frank Fenton,
Attys.

UNITED STATES PATENT OFFICE.

FRANK FENTON, OF AKRON, OHIO, ASSIGNOR TO THE MILLER RUBBER COMPANY, OF AKRON, OHIO, A CORPORATION OF OHIO.

PROCESS FOR MAKING PNEUMATIC TIRES AND AIR-BAGS THEREFOR.

1,335,101.                     Specification of Letters Patent.     Patented Mar. 30, 1920.

Application filed October 18, 1919. Serial No. 331,600.

*To all whom it may concern:*

Be it known that I, FRANK FENTON, a citizen of the United States, and resident of Akron, Ohio, have invented certain new and useful Improvements in Processes of Making Pneumatic Tires and Air-Bags Therefor, of which the following is a specification.

My present invention relates to an improved method of making pneumatic tire carcasses and means used in carrying out such method.

Heretofore in the manufacture of tire carcasses and particularly cord casings it has been customary to insert within the unvulcanized carcass what is termed an air bag which is in the form of an annulus, or similar in shape to an inner tube, but composed of layers of fabric and rubber, and made smaller than the cavity of the finished tire so that they may be placed within the carcass. They are then inflated under heavy pressure so as to straighten out the cords or fabric of the tire and expand it to the dimensions of the mold and hold it so expanded during vulcanization.

In use these air bags soon become permanently stretched so that difficulty is experienced in placing them within the carcasses and wrinkles form in the bags which weaken the fabric so that after a number of cures the bags are liable to blow out. When an air bag gives way during a cure it ruins the tire which is being cured thereon.

The present invention aims to avoid these objections in the manner hereinafter described and the invention includes the novel method and article as defined by the appended claims.

In order that my invention may be better understood reference is made to the accompanying drawing in which:—

Figure 1:
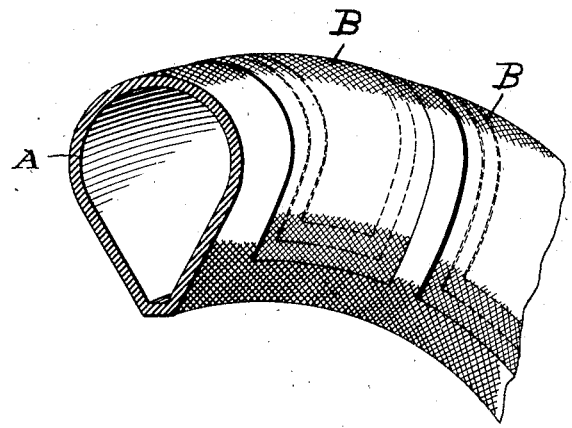
Figure 1 is a perspective view of a portion of an air bag constructed in accordance with my invention.
Figure 2:
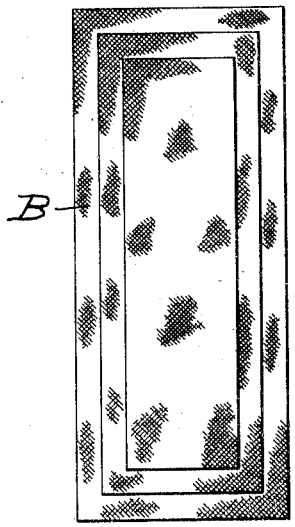
Fig. 2 is a detail view of one of the patches.

Referring by reference characters to this drawing the letter A designates an air bag which may be of the ordinary or any desired construction, it being understood that this would in practice be in the form of a complete annulus, and provided with any suitable means of inflation which, as it forms no part of the present invention, is not shown herein.

Superimposed upon the body of the air bag are a plurality of removable layers of fabric and rubber, preferably in the form of a series of sets of overlying or superimposed patches B which are applied to the outer surface of the bag so as to approximately cover the same. These patches are applied with cement after a preliminary dusting with soapstone powder so that while they will adhere sufficiently to enable the bag to be handled in the ordinary manner they are individually removable.

The air bag and superimposed patches are made of the proper circumference for the initial tire to be vulcanized thereon.

After the first tire is cured thereon an outer patch (or patches) is removed thus decreasing the dimensions of the bag by a small amount but sufficient to compensate for the permanent stretch of the bag. This process is repeated until all the layers or patches are removed, at the end of which time the bag has reached the limit of its stretch.

Having thus described my invention what I claim is:

1. The hereindescribed method of curing tires which consists in providing an air bag with a plurality of removable layers, successively inserting said bag in the tires and inflating the same, and vulcanizing the tires, and removing a layer from the air bag after each vulcanization.

2. The hereindescribed method of compensating for the stretch in air bags used in vulcanizing pneumatic tires which consists in providing said bag with removable covering layers, and successively removing said layers after the separate vulcanization.

3. The hereindescribed method of compensating for the stretch in air bags and in vulcanizing pneumatic tires which consists in reducing the external surface of the bag after each tire vulcanization.

4. An air bag for use in vulcanizing pneumatic tires having a removable outer surface layer.

5. An air bag for use in vulcanizing pneumatic tires having its outer surface provided with a plurality of individually removable patches.

In testimony whereof I affix my signature.

FRANK FENTON.